United States Patent
Kim et al.

(10) Patent No.: US 10,782,880 B2
(45) Date of Patent: Sep. 22, 2020

(54) APPARATUS AND METHOD FOR PROVIDING STORAGE FOR PROVIDING CLOUD SERVICES

(71) Applicant: ELECTRONICS AND TELECOMMUNICATIONS RESEARCH INSTITUTE, Daejeon (KR)

(72) Inventors: Dae-Won Kim, Daejeon (KR); Sun-Wook Kim, Hwaseong (KR); Seong-Woon Kim, Gyeryong (KR); Soo-Cheol Oh, Daejeon (KR); Jae-Geun Cha, Daejeon (KR); Ji-Hyeok Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 14 days.

(21) Appl. No.: 16/057,717

(22) Filed: Aug. 7, 2018

(65) Prior Publication Data
US 2019/0065061 A1 Feb. 28, 2019

(30) Foreign Application Priority Data

Aug. 30, 2017 (KR) .......... 10-2017-0109957
Oct. 23, 2017 (KR) .......... 10-2017-0137712
(Continued)

(51) Int. Cl.
*G06F 3/06* (2006.01)
*H04L 29/08* (2006.01)

(52) U.S. Cl.
CPC ............ *G06F 3/0604* (2013.01); *G06F 3/067* (2013.01); *G06F 3/0611* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 8,805,951 | B1 | 8/2014 | Faibish et al. |
| 9,076,250 | B2 | 7/2015 | Kim et al. |

(Continued)

FOREIGN PATENT DOCUMENTS

| | | | |
|---|---|---|---|
| EP | 2284725 | A1 | 2/2011 |
| EP | 2871817 | A1 | 5/2015 |

(Continued)

*Primary Examiner* — Yong J Choe

(57) ABSTRACT

Disclosed herein are an apparatus and method for providing storage for providing a cloud service. The apparatus includes a data distribution and storage unit for distributing data in order to store the data in integrated storage, including on-premises storage and cloud storage; a backend storage management unit for connecting to the integrated storage in order to store the data and providing information about storage tiering pertaining to the data; a data manipulation unit for providing the integrated storage as virtual data storage regardless of a location at which the data is actually stored; and a storage connection unit for providing a user with an interface for the virtual data storage as a single virtual storage unit.

8 Claims, 13 Drawing Sheets

(30) Foreign Application Priority Data

May 14, 2018 (KR) ........................ 10-2018-0054951
May 14, 2018 (KR) ........................ 10-2018-0054966

(52) U.S. Cl.
CPC .......... *G06F 3/0626* (2013.01); *G06F 3/0631* (2013.01); *G06F 3/0659* (2013.01); *G06F 3/0665* (2013.01); *H04L 67/1097* (2013.01)

(56) References Cited

U.S. PATENT DOCUMENTS

| | | |
|---|---|---|
| 9,588,901 B2 | 3/2017 | Chahal et al. |
| 9,678,880 B1 | 6/2017 | Korotaev et al. |
| 9,697,376 B2 | 7/2017 | Madanapalli et al. |
| 9,727,470 B1 | 8/2017 | Cande et al. |
| 2013/0254326 A1* | 9/2013 | Weng .................. H04L 67/1097 709/215 |
| 2014/0013045 A1 | 1/2014 | Crossland et al. |
| 2014/0067990 A1 | 3/2014 | Abdelhameed et al. |
| 2014/0173171 A1 | 6/2014 | Chen et al. |
| 2015/0205819 A1 | 7/2015 | Brand |
| 2016/0142399 A1 | 5/2016 | Pace et al. |
| 2016/0292193 A1 | 10/2016 | Madanapalli et al. |
| 2017/0147755 A1 | 5/2017 | Lim et al. |
| 2017/0193233 A1 | 7/2017 | Lorini |
| 2017/0195417 A1 | 7/2017 | Brand |
| 2017/0208043 A1 | 7/2017 | Bohli et al. |
| 2017/0208052 A1 | 7/2017 | Jai et al. |

FOREIGN PATENT DOCUMENTS

| | | |
|---|---|---|
| KR | 10-1180288 B1 | 9/2012 |
| KR | 10-1212778 B1 | 12/2012 |
| KR | 10-2017-0107967 A | 9/2017 |

\* cited by examiner

110

APPARATUS AND METHOD FOR PROVIDING STORAGE FOR PROVIDING CLOUD SERVICES

CROSS REFERENCE TO RELATED APPLICATIONS

This application claims the benefit of Korean Patent Application No. 10-2017-0109957, filed Aug. 30, 2017, No. 10-2017-0137712, filed Oct. 23, 2017, No. 10-2018-0054966, filed May 14, 2018, and No. 10-2018-0054951, filed May 14, 2018, which are hereby incorporated by reference in their entirety into this application.

BACKGROUND OF THE INVENTION

1. Technical Field

The present invention relates generally to cloud-computing technology, and more particularly to a storage integration method for combining cloud storage and non-cloud storage.

2. Description of the Related Art

These days, the development of technology for cloud computing, which enables a user to use a desired service without restrictions as to time and place, is accelerated, and market demand therefor continues to increase. Cloud computing may provide network, storage, and computing services desired by users using the Internet, without the need to provide hardware and software for each user.

In the case of a storage system related to a data storage service, among cloud-computing techniques, a user may request to store data using a secure and convenient service interface provided by the system. In this regard, a cloud-integrated storage system that stores data in cloud-integrated storage that appears as a single storage space even though both on-premises storage and public cloud storage are integrated therein has been developed.

Particularly, the cloud-integrated storage system may manage and operate on-premises public storage that appears as a single storage space while making use of the advantages both of on-premises storage possessed by companies and organizations and of public cloud storage provided by a cloud provider.

Using on-premises public storage appearing as a single storage space, the cloud-integrated storage system may provide a converged storage infrastructure service that secures the flexibility and cost efficiencies of a storage space and guarantees reliability and control over sensitive data.

Accordingly, the cloud-integrated storage system may extend the use of cloud services to various fields and use the cloud services in order to create new business models.

Trends of existing similar systems are as follows.

In order to support operations for 'IDC's 3rd Platform', for example, real-time analysis, IoT, AI computing, and the like, there is a strong demand to construct and adopt a hybrid cloud-computing service.

Also, IDC's 3rd Platform aims to support the extension of computing resources by unifying various cloud models and to improve automation and computing environment management efficiency.

HP provides infrastructure management functions using a RESTful API based on OpenStack and provides a Helion Eucalyptus platform, which is open-source software designed to be compatible with Amazon Web Services (AWS).

VMware launched vCloud Hybrid Service (vCHS), which provides virtualization of servers, storage, and networking in an integrated manner based on existing virtualization solutions and infrastructure of VMware.

Rackspace focuses on the extension of cloud infrastructure and integrates a cloud server with an enterprise Storage Area Network (SAN). Also, Rackspace supports data protection by deploying Cisco ASA firewalls.

Avere FlashCloud of Avere Systems and StorSimple of Microsoft have cloud storage gateway capabilities for storage tiering, based on which data is stored in local or cloud storage depending on the frequency of use of the data, in order to provide data backup, archiving, and applications for a tier 2 level, as well as a disaster recovery service.

Data replication for storing the same data in both local storage and public storage may be performed through copying in a cloud storage gateway, and a cloud storage gateway solution of CTERA Networks is a representative example thereof. The solution additionally provides file distribution, synchronization and sharing services.

Meanwhile, Korean Patent No. 10-1212778, titled "Cloud-computing-based smart office system and server and method for operating the same", discloses a smart office system, including a cloud-based mobile web server and an on-premises mobile web server, and a server and method for operating the smart office system.

SUMMARY OF THE INVENTION

An object of the present invention is to improve the performance of read/write operations in integrated storage that combines cloud storage and on-premises storage.

Another object of the present invention is to enable cloud storage and on-premises storage included in integrated storage to provide a data storage service with the same performance.

A further object of the present invention is to move data of a user based on the flexibility of a storage space and cost efficiencies.

Yet another object of the present invention is to support various types of cloud storage services, such as Amazon S3, Microsoft Azure, and the like, thereby providing an integrated storage service that meets user requirements.

Still another object of the present invention is to enable data in cloud storage to be accessed at a speed close to the speed at which data in on-premises storage is accessed.

Still another object of the present invention is to provide a service interface through which a user may access cloud-integrated storage using various service protocols.

Still another object of the present invention is to provide various types of storage services, such as a storage service for storing conventional files or data blocks, a storage service for storing objects, which has recently come to be provided by cloud storage providers, and the like.

Still another object of the present invention is to guarantee secure data transfer between on-premises storage and cloud storage, thereby guaranteeing the confidentiality of user data.

Still another object of the present invention is to prevent data loss caused due to system errors.

Still another object of the present invention is to provide a multi-tenant function for simultaneously performing multiple cloud services.

In order to accomplish the above objects, an apparatus for providing storage for providing a cloud service according to an embodiment of the present invention includes a data distribution and storage unit for distributing data in order to store the data in integrated storage, including on-premises storage and cloud storage; a backend storage management unit for connecting to the integrated storage in order to store the data and providing information about storage tiering pertaining to the data; a data manipulation unit for providing the integrated storage as virtual data storage regardless of a location at which the data is actually stored; and a storage connection unit for providing a user with an interface for the virtual data storage as a single virtual storage unit.

Here, the data distribution and storage unit may minimize time taken to write and access data by optimizing the data to be written to the integrated storage, and may perform compression or encryption of the data.

Here, the data manipulation unit may provide a write buffer function or a read cache function for the data and decrease a response time of a write operation or a read operation for the data using high-speed storage.

Here, the apparatus may further include a provisioning and policy management unit for providing metadata for storing and distributing the data, and the metadata may include first metadata for data operations and second metadata for storage operations.

Also, in order to accomplish the above objects, a method for providing storage for providing a cloud service, performed by an apparatus for providing storage for providing a cloud service, according to an embodiment of the present invention includes distributing data in order to store the data in integrated storage, including on-premises storage and cloud storage; and managing the data by providing the integrated storage as virtual data storage regardless of a location at which the data is actually stored and by providing a user with an interface for the virtual data storage as a single virtual storage unit.

Here, managing the data may include connecting to the integrated storage in order to store the data, and providing information about storage tiering pertaining to the data.

Here, distributing the data may be configured to minimize time taken to write and access data by optimizing the data to be written to the integrated storage; and to perform compression or encryption of the data.

Here, managing the data may be configured to provide a write buffer function or a read cache function for the data and to decrease a response time of a write operation or a read operation for the data using high-speed storage.

Here, the method may further include performing provisioning by providing metadata for storing and distributing the data, and the metadata may include first metadata for data operations and second metadata for storage operations.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
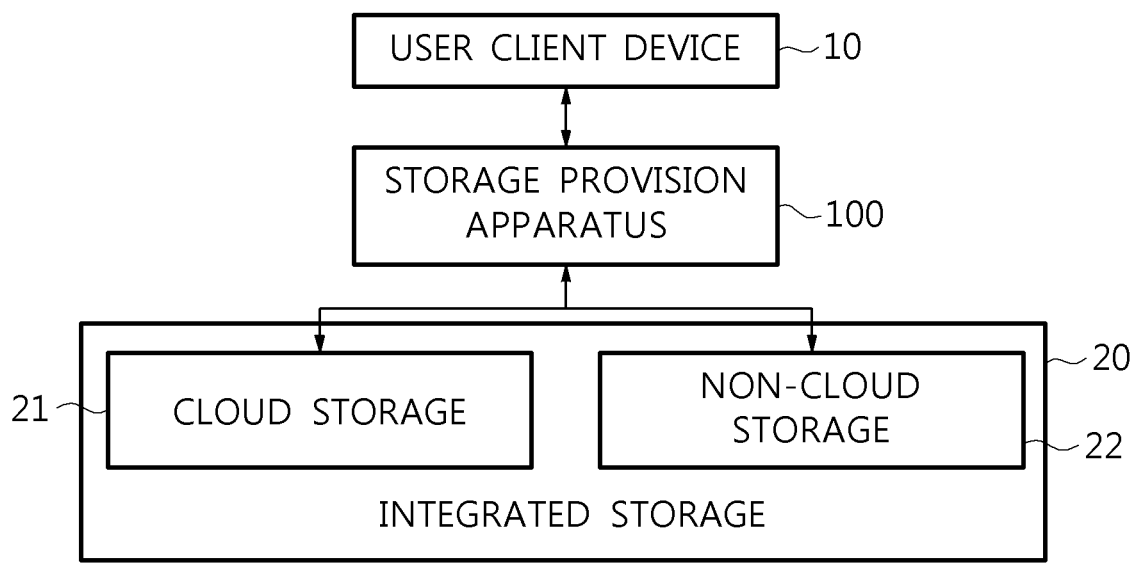
FIG. 1 is a block diagram that shows an integrated storage system according to an embodiment of the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

FIG. 1 is a block diagram that shows an integrated storage system according to an embodiment of the present invention.

Referring to FIG. 1, an integrated storage system according to an embodiment of the present invention may include a user client device 10, a storage provision apparatus 100 for providing a cloud service, and integrated storage 20.

The user client device 10 enables a user to request and receive the service of the integrated storage 20 using the storage provision apparatus 100.

The integrated storage may include cloud storage 21 and non-cloud storage 22.

The cloud storage 21 may be public cloud storage provided by a cloud provider.

The non-cloud storage 22 may be on-premises storage possessed by companies and organizations.

The storage provision apparatus 100 may manage and operate the cloud storage 21 and the non-cloud storage 22 included in the integrated storage 20 as unified storage.

Here, the storage provision apparatus 100 may provide a cloud service with consistent performance so that a user may not be able to distinguish access to the cloud storage 21 from access to the non-cloud storage 22.

Figure 2:
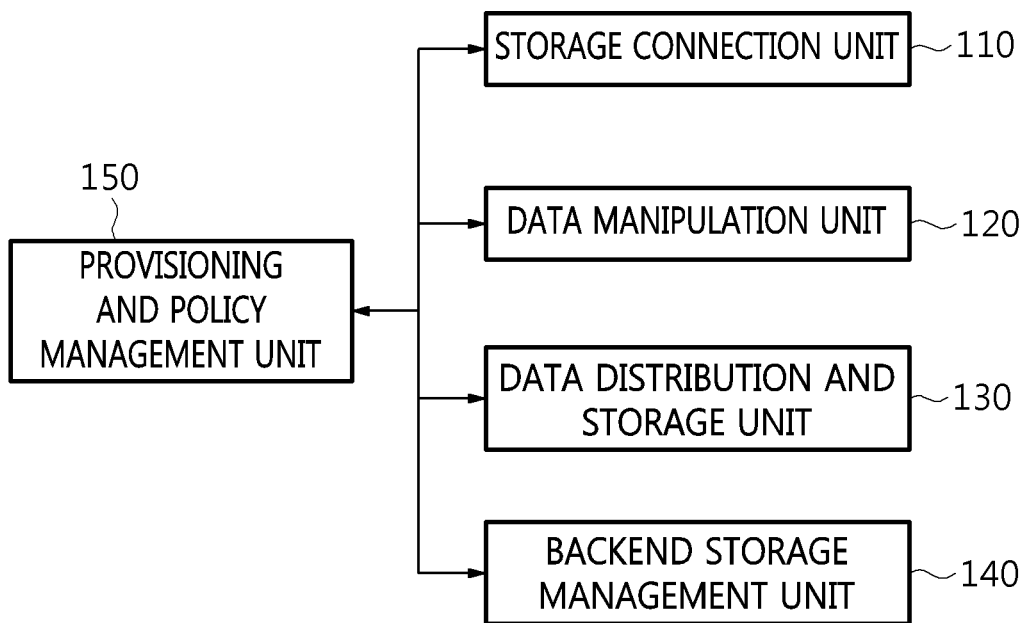
FIG. 2 is a block diagram that shows an apparatus for providing storage for providing a cloud service according to an embodiment of the present invention.
Figure 3:
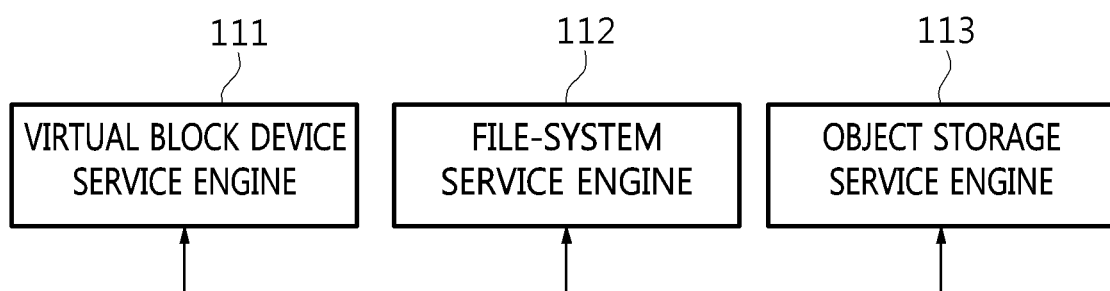
FIG. 3 is a block diagram that specifically shows an example of the storage connection unit illustrated in FIG. 2.
Figure 4:
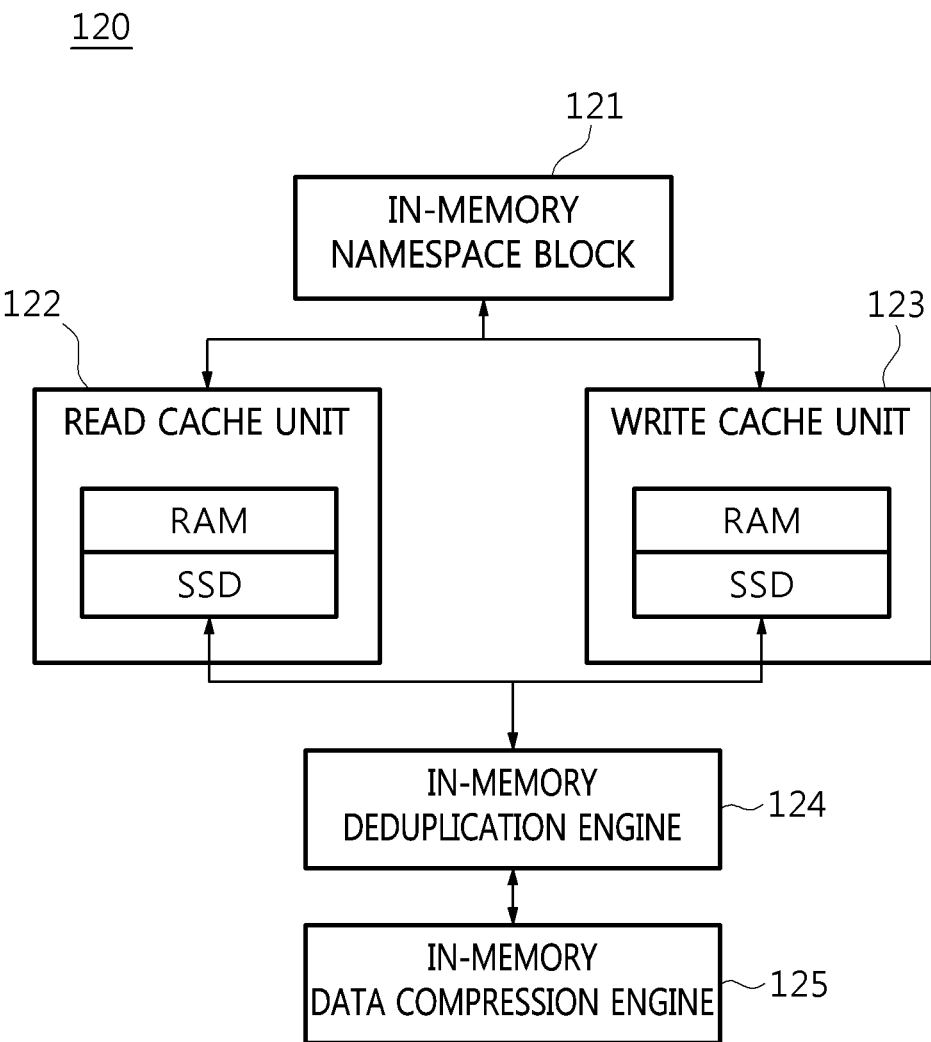
FIG. 4 is a block diagram that specifically shows an example of the data manipulation unit illustrated in FIG. 2.

FIG. 2 is a block diagram that shows an apparatus for providing storage for providing a cloud service according to an embodiment of the present invention. FIG. 3 is a block diagram that specifically shows an example of the storage connection unit illustrated in FIG. 2. FIG. 4 is a block diagram that specifically shows an example of the data manipulation unit illustrated in FIG. 2.

Referring to FIG. 2, the apparatus 100 for providing storage for providing a cloud service according to an embodiment of the present invention includes a storage connection unit 110, a data manipulation unit 120, a data distribution and storage unit 130, a backend storage management unit 140, and a provisioning and policy management unit 150.

The storage connection unit 110 may provide the service of the integrated storage 20 to a user by operating in conjunction with the integrated storage 20.

Referring to FIG. 3, the storage connection unit 110 may include a virtual block device service engine 111, a filesystem service engine 112, and an object storage service engine 113.

Here, the storage connection unit 110 may process the protocols of block storage, file storage, and object storage and may provide an I/O interface and an acceleration function for improving processing of the protocols.

Here, the storage connection unit 110 may basically provide a user with block device and file system services, which are conventional storage service interfaces, and may also provide an object storage interface that has recently emerged.

The data manipulation unit 120 may provide a single storage view of the entire storage system by providing a virtual disk pool to a user.

That is, the data manipulation unit 120 may form a virtual disk pool using a fast storage resource, and may provide a user with storage devices as a virtual disk.

Here, the data manipulation unit 120 may provide the integrated storage 20 as virtual data storage regardless of the location at which data is actually stored.

Here, the storage connection unit 110 may provide a user with an interface for the virtual data storage as a single virtual storage unit.

Therefore, even though data is physically distributed across various types of storage, a user may be provided with a single storage configuration regardless of the location at which the data is actually stored.

The data manipulation unit 120 may provide at least one of a write buffer function and a read cache function for data and may improve the response time of read and write operations for the data using high-speed storage.

Here, the data manipulation unit 120 may provide data management functions, such as snapshots, fast replication, a distributed transaction log, and the like.

Here, the data manipulation unit 120 may provide a write buffer function or a read cache function to a user when a data write operation or a data read operation is performed.

Here, the data manipulation unit 120 may use memory, a Solid-State Drive (SSD), and a PCIe flash card to guarantee a fast response time to a user.

Here, the data manipulation unit 120 may provide a read/write cache for data using a RAM disk in order to provide the service of the integrated storage.

The data manipulation unit 120 may provide the function of caching the data stored in public cloud storage, which is the cloud storage 21. Because data stored in the public cloud storage is transferred using an Internet network, the data access speed is slower than that of on-premises storage, which is the non-cloud storage 22.

Also, because data is automatically distributed across public cloud storage in the state in which a user cannot recognize the distribution of the data, a function for quickly accessing data stored in the public cloud storage is required.

The data manipulation unit 120 caches data stored in the public cloud storage to a storage device within the cloud-integrated storage operating platform, whereby the data in the public cloud storage may be accessed at a speed close to the speed at which data in the on-premises storage is accessed.

Referring to FIG. 4, the data manipulation unit 120 may include an in-memory namespace block 121, a read cache unit 122, a write cache unit 123, an in-memory deduplication engine 124, and an in-memory data compression engine 125.

The in-memory namespace block 121 may store information that is periodically and repeatedly read and written in order to access actual data, and may guarantee high access speed.

Here, the in-memory namespace block 121 stores information that is necessary for access to data in high-speed main memory, thereby providing the function of storing and managing the data.

Here, the in-memory namespace block 121 is a volatile storage medium and has a limited capacity. Therefore, the namespace block is backed up in real time, and the namespace block that is backed up may provide high availability through clustering of multiple nodes (virtual machines or physical servers).

Here, in order to provide fast performance of the integrated storage, the data manipulation unit 120 may use the in-memory namespace block 121 and run both the in-memory deduplication engine 124 and the in-memory data compression engine 125, which reduce the amount of data, in the in-memory block.

Here, the data manipulation unit 120 is required to guarantee a high speed when a global namespace for accessing actual data is accessed, and may provide a high-speed processing method in order to quickly write and read data.

Each of the read cache unit 122 and the write cache unit 123 is in the form of a RAM disk, and may be configured as a single disk, which includes RAM, corresponding to main memory, and a Solid-State Drive (SSD).

The read cache unit 122 and the write cache unit 123 may back up data in real time in the SSD because the RAM is volatile.

Here, when the RAM-based cache area is exhausted, the read cache unit 122 and the write cache unit 123 may automatically make the SSD-based cache area replace the RAM-based cache area.

Here, when a user writes data, the read cache unit 122 and the write cache unit 123 may return a result immediately after writing the data in a memory area for a fast response thereto.

The in-memory deduplication engine 124 and the in-memory data compression engine 125 may correspond to the data distribution and storage unit 130, which will be described later.

That is, the data distribution and storage unit 130 may be included in the data manipulation unit 120.

The in-memory deduplication engine 124 may provide the function of storing data in multiple physical devices in a distributed manner in order to prevent data loss.

Here, the in-memory deduplication engine 124 applies error detection and recovery code for detecting the occurrence of errors in data and correcting the errors, thereby responding to data and system errors.

The in-memory data compression engine 125 compresses actual data to be stored in the backend storage, thereby reducing the size of the data. Particularly, the in-memory data compression engine 125 reduces the size of the data to be stored in the public cloud storage through compression, thereby reducing the size of the data to be transferred over a network.

The data distribution and storage unit 130 may distribute data in order to store the data in the integrated storage 20, which includes the on-premises storage and the cloud storage.

Here, the data distribution and storage unit 130 may provide an optimization function for the received data to be written such that the data may always be accessed with the minimum overhead.

Here, the data distribution and storage unit 130 optimizes the data to be written in the integrated storage 20 in order to minimize the time taken to write and access the data, and may perform at least one of compression and encryption of the data.

Here, the data distribution and storage unit 130 partitions each object into multiple segments in order to efficiently manage data, and may store the partitioned segments in another node or a data center in a distributed manner in order to improve reliability.

Here, the data distribution and storage unit 130 may optionally encrypt or compress the partitioned segments and enact a policy decision therefor.

Here, the data distribution and storage unit 130 applies error detection and recovery code for detecting the occurrence of errors in data and correcting the errors, thereby responding to data and system errors.

The backend storage management unit 140 may provide a storage interface of the cloud storage 21 and the non-cloud storage 22 in order to store data created in the data distribution and storage unit 130 in the final resource.

Here, the backend storage management unit 140 may be connected with the integrated storage in order to store data and provide information about storage tiering pertaining to the data to be stored.

Here, the backend storage management unit 140 may provide the function of automatically or manually storing data using storage tiering based on performance, time, and the frequency of use according to the policy of a distributed storage hierarchy.

Here, the backend storage management unit 140 may provide the function of automatically distributing and storing data in various storage tiers.

Here, the backend storage management unit 140 may tier various types of storage based on the characteristics of the provided storage.

Here, the backend storage management unit 140 may initially store created data in high-speed storage, move the data to a lower tier of storage when the data is less frequently accessed, and finally store the data in the public cloud storage.

Here, the backend storage management unit 140 may automatically move data between various tiers of storage depending on the characteristics of the data.

The provisioning and policy management unit 150 may manage the respective tiers and a user-based policy. Here, the provisioning and policy management unit 150 may provide a hierarchical interface for disk provisioning requested by a user.

Here, the provisioning and policy management unit 150 may provide metadata for storing and distributing data.

Here, the metadata may include first metadata for data operations and second metadata for storage operations.

Here, the metadata is necessary in order to manage and access the data stored in the backend storage. The metadata of the present invention may be created when a user uses the client device 10, or client metadata for an interface between the user client device 10 and the integrated-cloud management device, data management metadata that is necessary for data manipulation, and storage management metadata for backend storage may be used.

Figure 5:
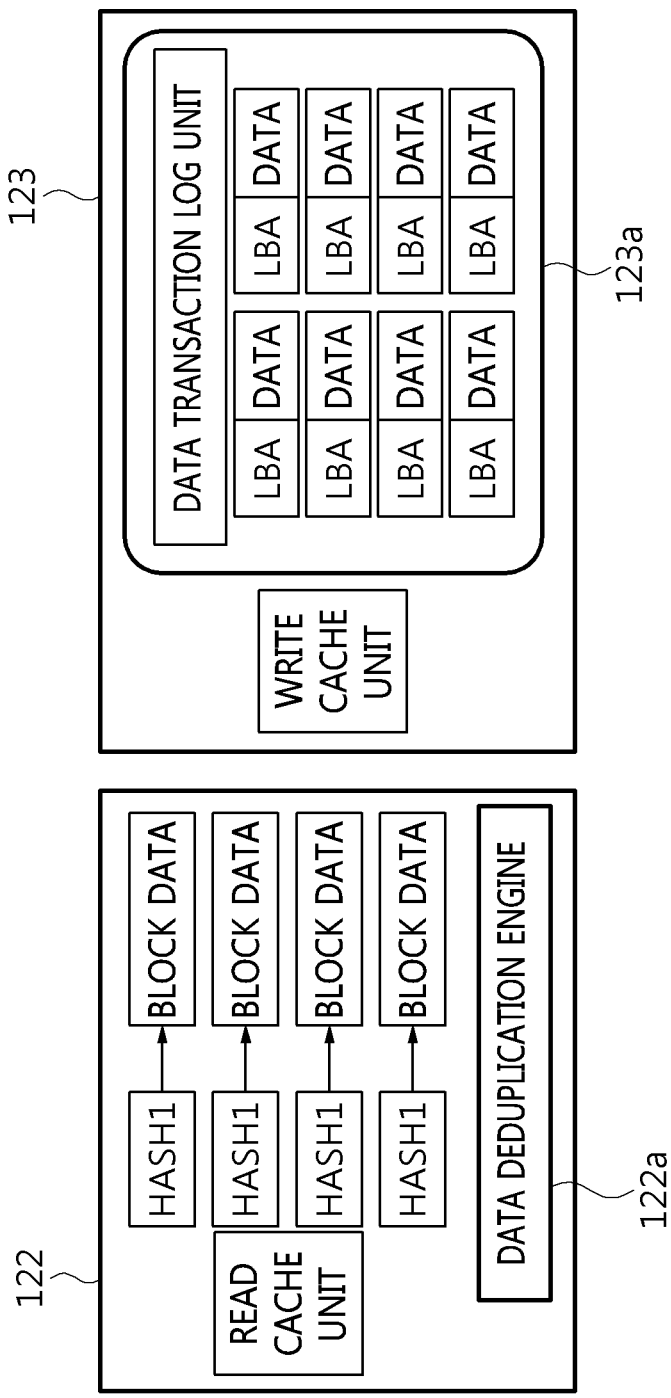
FIG. 5 is a view that shows an example of a RAM disk according to an embodiment of the present invention.

FIG. 5 is a view that shows an example of a RAM disk according to an embodiment of the present invention.

Referring to FIG. 5, the read cache unit 122 and the write cache unit 123, which are the RAM disk of the data manipulation unit 120, are specifically illustrated.

The read cache unit 122 distributes data as multiple pieces of block data depending on hashes using a data deduplication engine 122*a*.

The write cache unit 123 manages a log for data recovery in the same node or another node connected therewith over a network using a data transaction log unit 123*a* in preparation for the case in which data stored in a write cache is lost due to system errors.

A log may save the location of data in a certain block and the hash value thereof, and may be maintained until the data is stored in backend storage.

The write cache may be synchronized with the transaction log node when a log queue reaches a certain size or a certain time is exceeded, or whenever data is generated in response to a request to write the data. The block located in the write cache may be replicated to the transaction log node under a certain condition. When data in the corresponding block is stored in the backend storage, the block in the write cache and the block in the transaction log node may be deleted therefrom because the data is removed from data to be managed.

Figure 6:
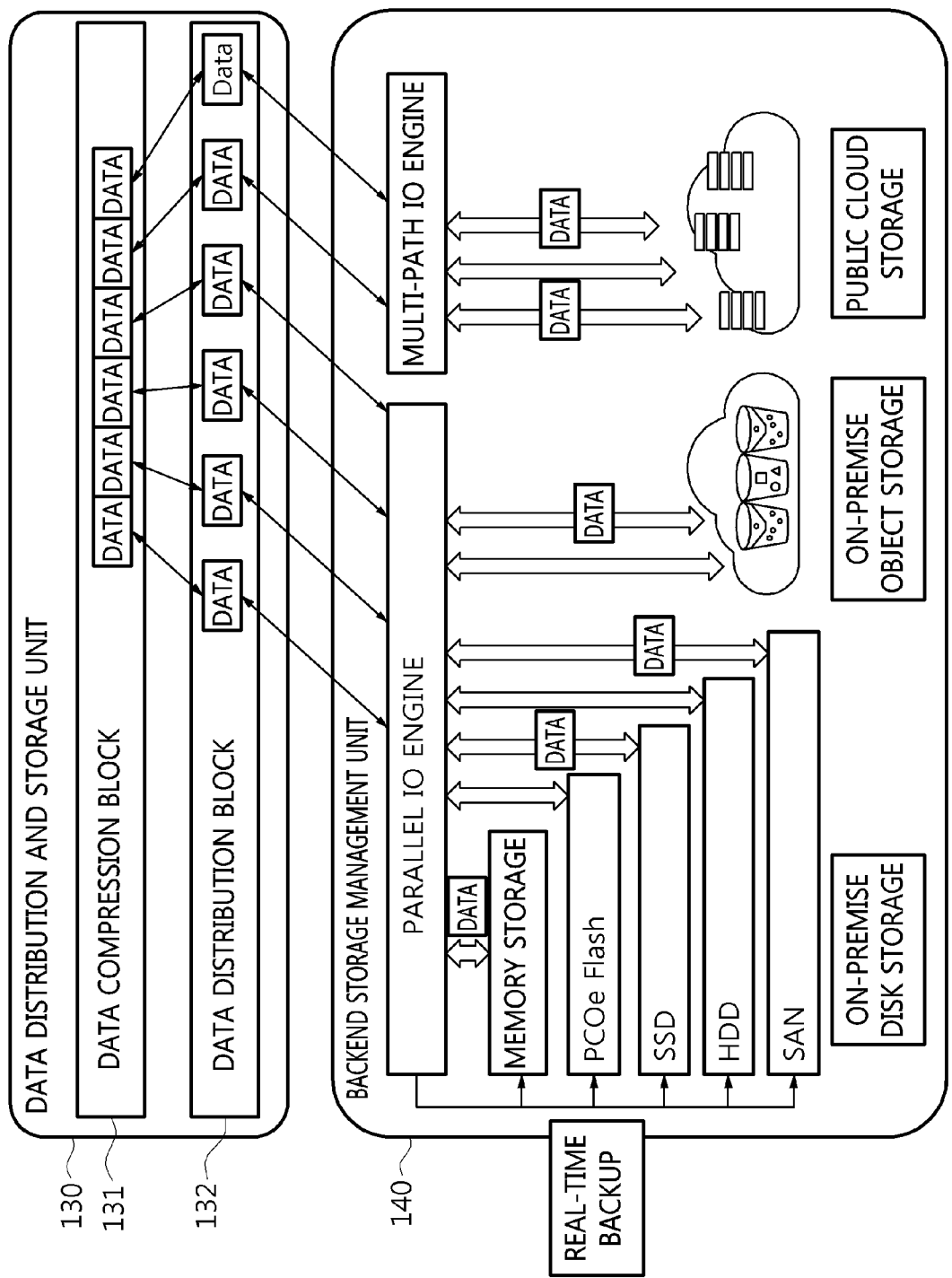
FIG. 6 is a view that specifically shows the operations of a data distribution and storage unit and a backend storage management unit according to an embodiment of the present invention.

FIG. 6 is a view that specifically shows the operations of a data distribution and storage unit and a backend storage management unit according to an embodiment of the present invention.

Referring to FIG. 6, the data compression block 131 of the data distribution and storage unit 130 compresses the actual data to be stored in the backend storage, thereby reducing the size of the data. Particularly, the data compression block 131 reduces the size of the data to be stored in the public cloud storage through compression, thereby reducing the size of the data to be transferred over a network.

The data distribution block 132 may provide the function of storing data in multiple physical devices in a distributed manner in order to prevent data loss.

Here, the data distribution block 132 applies error detection and recovery code for detecting the occurrence of errors in data and correcting the errors, thereby responding to data and system errors.

The backend storage management unit 140 may include a Hard Disk Drive (HDD), Serial Attached SCSI (SAS) storage, iSCSI storage, public cloud storage, and the like, and may provide an interface for finally storing data in the backend storage.

Here, the backend storage management unit 140 uses various types of storage, ranging from memory storage for guaranteeing fast response time to cloud storage for managing a large volume of data, through a data distribution strategy, a parallel I/O engine, and a multi-path I/O engine, thereby providing a high-availability service related to the connected storage and data management.

Here, the backend storage management unit 140 may store data in storage in the same node or storage in multiple nodes configured as a cluster such that the data is distributed, and may adjust the data size and the number of nodes across which the data is distributed, whereby data loss caused by system errors may be prevented.

The backend storage management unit 140 provides the function of automatically distributing and storing data in various tiers of storage. Here, based on the characteristics of the provided storage, various types of storage may be tiered. Initially, created data is stored in high-speed storage, data is moved to a lower tier of storage when the data is less frequently accessed, and the data is finally stored in the public cloud storage. The backend storage management unit 140 may automatically move data between various tiers of storage depending on the characteristics of the data.

Figure 7:
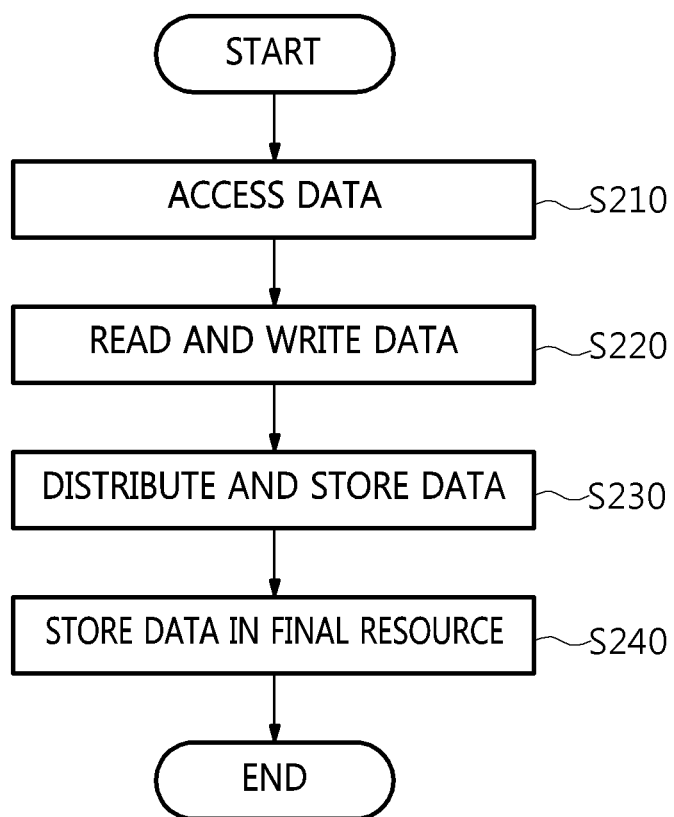
FIG. 7 is a flowchart that shows a method for providing storage for providing a cloud service according to an embodiment of the present invention.

FIG. 7 is a flowchart that shows a method for providing storage for providing a cloud service according to an embodiment of the present invention.

Referring to FIG. 7, in the method for providing storage for providing a cloud service according to an embodiment of the present invention, first, data may be accessed at step S210.

That is, data may be accessed at step S210 in order to provide the service of integrated storage 20.

Here, at step S210, a virtual disk pool is provided to a user, whereby a single storage view of the entire storage system may be provided.

Here, at step S210, the integrated storage 20 is provided as virtual data storage regardless of the location at which data is actually stored, and an interface for the virtual data storage as a single virtual storage unit may be provided to a user.

In the method for providing storage for providing a cloud service according to an embodiment of the present invention, data may be read or written at step S220.

That is, at step S220, a read/write cache for data may be provided using a RAM disk in order to provide the service of the integrated storage.

Here, at step S220, at least one of a write buffer function and a read cache function for data is provided, and the response time of write and read operations for the data may be improved using high-speed storage.

Here, at step S220, data stored in the public cloud storage is cached to a storage device within the cloud-integrated storage operating platform, whereby the data in the public cloud storage may be accessed at a speed close to the speed at which data in on-premises storage is accessed.

Here, at step S220, data read and write operations are performed using a RAM disk configured as a single disk, which includes RAM, corresponding to main memory, and an SSD. Here, when the RAM-based cache area is exhausted, the SSD-based cache area may automatically replace the RAM-based cache area.

In the method for providing storage according to an embodiment of the present invention, data may be distributed and stored at step S230.

That is, at step S230, the object of the data may be distributed and stored, and the distributed object may be encrypted and compressed.

Here, at step S230, error detection and recovery code for detecting the occurrence of errors in data and correcting the errors is applied, whereby it is possible to respond to data and system errors.

Here, at step S230, data may be distributed in order to store the data in the integrated storage 20, including the on-premises storage and the cloud storage.

Here, at step S230, the received data to be written may be optimized such that the data may always be accessed with the minimum overhead.

Here, at step S230, the data to be written to the integrated storage 20 is optimized in order to minimize the time taken to write and access the data. To this end, at least one of compression and encryption of the data may be performed.

Here, at step S230, each object is partitioned into multiple segments in order to efficiently manage data, and the partitioned segments may be stored in another node or a data center in a distributed manner in order to improve reliability.

Here, at step S230, the partitioned segments may be optionally encrypted or compressed, and a policy decision therefor may be reflected.

In the method for providing storage according to an embodiment of the present invention, data may be stored in the final resource at step S240.

That is, at step S240, the final data created at step S230 may be stored in the final resource.

Here, at step S240, the integrated storage is connected in order to store the data, and information about storage tiering pertaining to the data to be stored may be provided.

Here, at step S240, the function of automatically or manually storing data may be provided using storage tiering based on performance, time, and the frequency of use according to the policy of a distributed storage hierarchy.

Here, at step S240, the function of automatically distributing and storing data in various tiers of storage may be provided.

Here, at step S240, various types of storage may be tiered based on the characteristics of the provided storage.

Here, at step S240, created data is initially stored in high-speed storage, the data is moved to a lower tier of storage when the data is less frequently accessed, and the data may be finally stored in the public cloud storage.

Here, at step S240, data may be automatically moved between various tiers of storage depending on the characteristics of the data.

Figure 8:
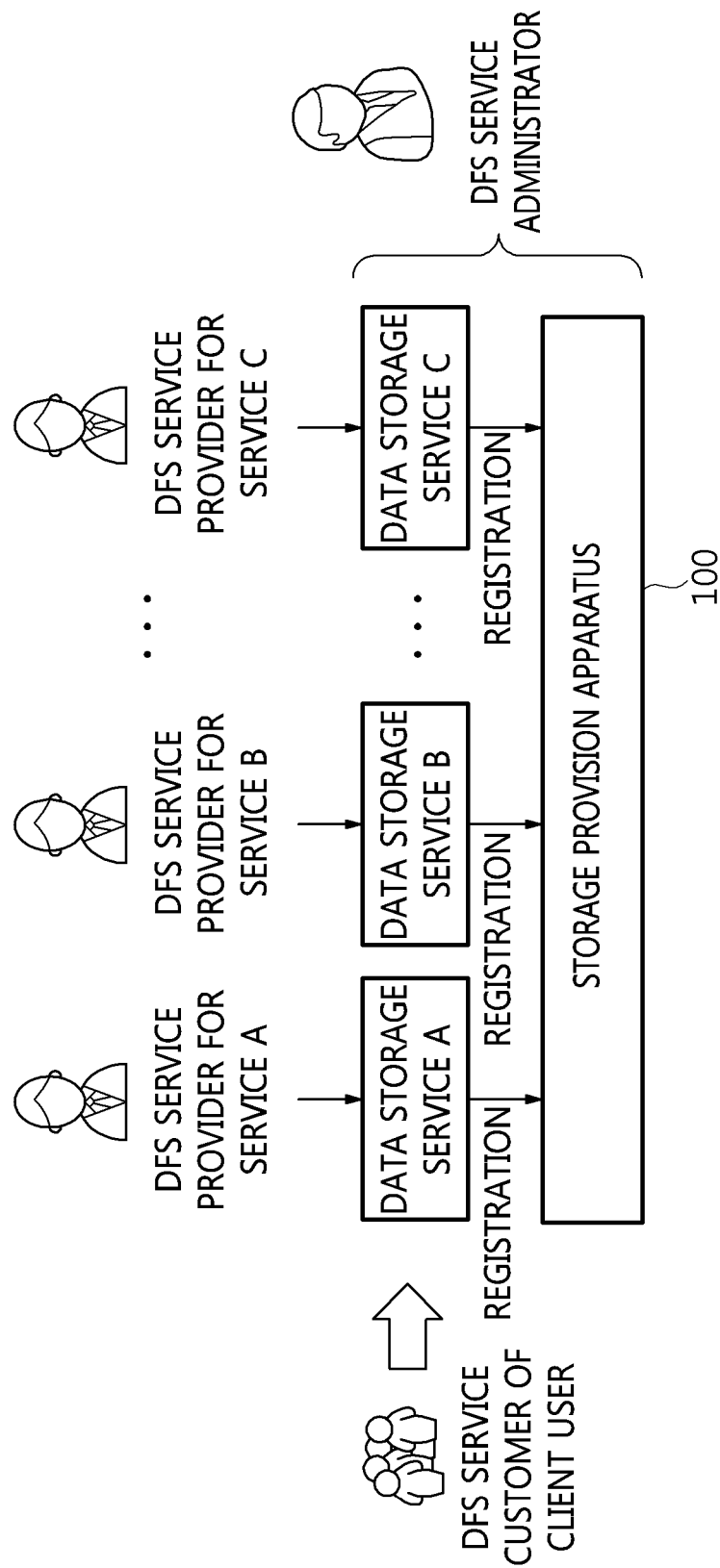
FIG. 8 is a view that shows the relationship between a service provider and an apparatus for providing storage for providing a cloud service according to an embodiment of the present invention.

FIG. 8 is a view that shows the relationship between a service provider and an apparatus for providing storage according to an embodiment of the present invention.

Referring to FIG. 8, the storage provision apparatus 100 according to an embodiment of the present invention may enable multiple Distributed File System (DFS) service providers to register their data storage services A to N in the storage provision apparatus 100.

Here, a DFS service administrator may provide the registered multiple storage services to users through the storage provision apparatus 100.

Here, DFS service customers, that is, clients or users, may be provided with the multiple storage services using the storage provision apparatus 100.

Here, the storage provision apparatus 100 may manage integrated storage 20 based on multi-tenant architecture in order to provide multiple storage services.

Figure 9:
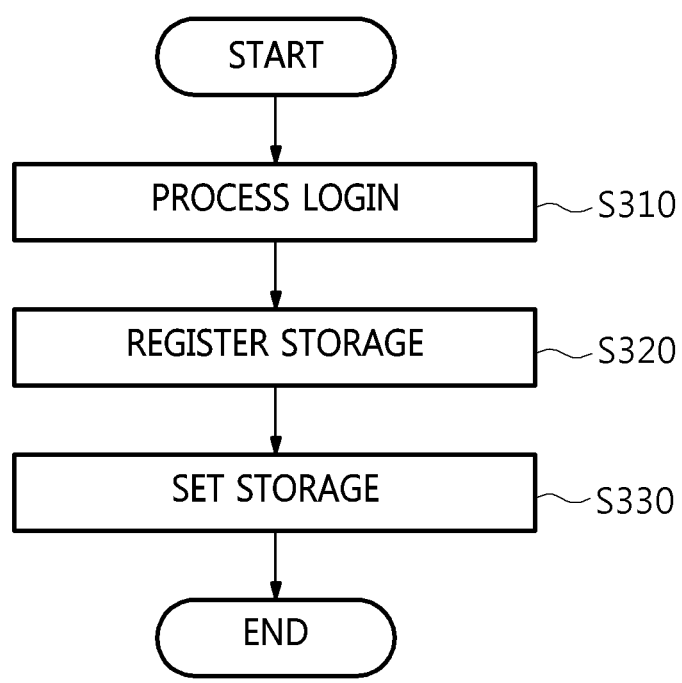
FIG. 9 is a flowchart that shows a storage provision method for registering a storage service according to an embodiment of the present invention.

FIG. 9 is a flowchart that shows a storage provision method for registration of a storage service according to an embodiment of the present invention.

Referring to FIG. 9, in the storage provision method for registration of a storage service according to an embodiment of the present invention, first, the storage provision apparatus 100 may process the login of a provider at step S310.

Here, at step S310, in order to register a storage service, the provider may log on to the storage provision apparatus 100 using his or her ID and password, which have been registered in advance.

Here, at step S310, if the ID and password of the provider are not registered, a new ID and password may be created.

Also, in the storage provision method for registration of a storage service according to an embodiment of the present invention, a storage service may be registered in the storage at step S320.

That is, at step S320, cloud storage 21 and non-cloud storage 22 are checked in order to register a storage service, and the storage service may be registered.

Here, at step S320, a registration method may be provided to the provider using a GUI so that the provider may easily register a storage service.

Here, at step S320, a storage service name, the specifications of storage (the size, whether caching is supported, the number of tiers, whether encryption is supported, whether on-premises storage is supported, and the like), a data storage service protocol, the name and type of cloud storage, and the like are input by the provider via the GUI, and the service may be registered in the storage corresponding to the input information.

Here, the information input via the GUI may be registered in advance when a new provider registers his or her ID and password.

Also, in the storage provision method for registration of a storage service according to an embodiment of the present invention, storage may be configured at step S330.

That is, at step S330, virtual storage corresponding to the storage in which the storage service is registered may be created.

Here, at step S330, the virtual storage may be registered in a virtual disk pool. Using the virtual disk pool, a single storage view for providing a storage service may be provided to users.

Figure 10:
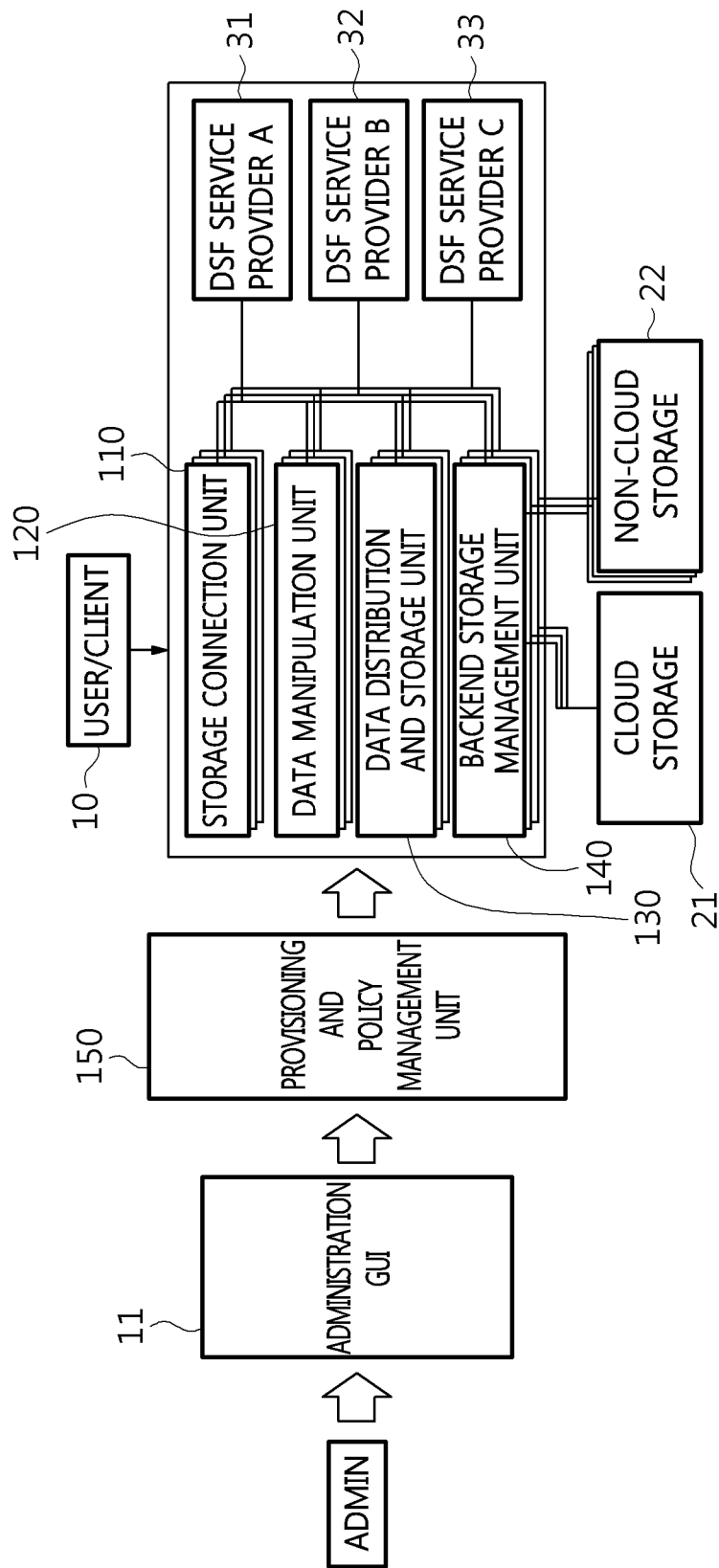
FIG. 10 is a block diagram that shows an apparatus for providing storage for providing a cloud service according to an embodiment of the present invention.

FIG. 10 is a block diagram that shows an apparatus for providing storage according to an embodiment of the present invention.

Referring to FIG. 10, the apparatus for providing storage according to an embodiment of the present invention is configured as multi-tenant storage by including as many storage connection units 110, as many data manipulations units 120, as many data distribution and storage units 130, and as many backend storage management units 140 as the number of storage services registered by DFS service providers A to C. Here, the respective units become the components of each layer or main components of the storage provision apparatus 100.

That is, the storage provision apparatus 100 may support a multi-tenant function for simultaneously performing multiple services.

Here, a provisioning and policy management unit 150 may provide an administration GUI to an administrator, and may provide and manage a multi-tenant storage service.

Figure 11:
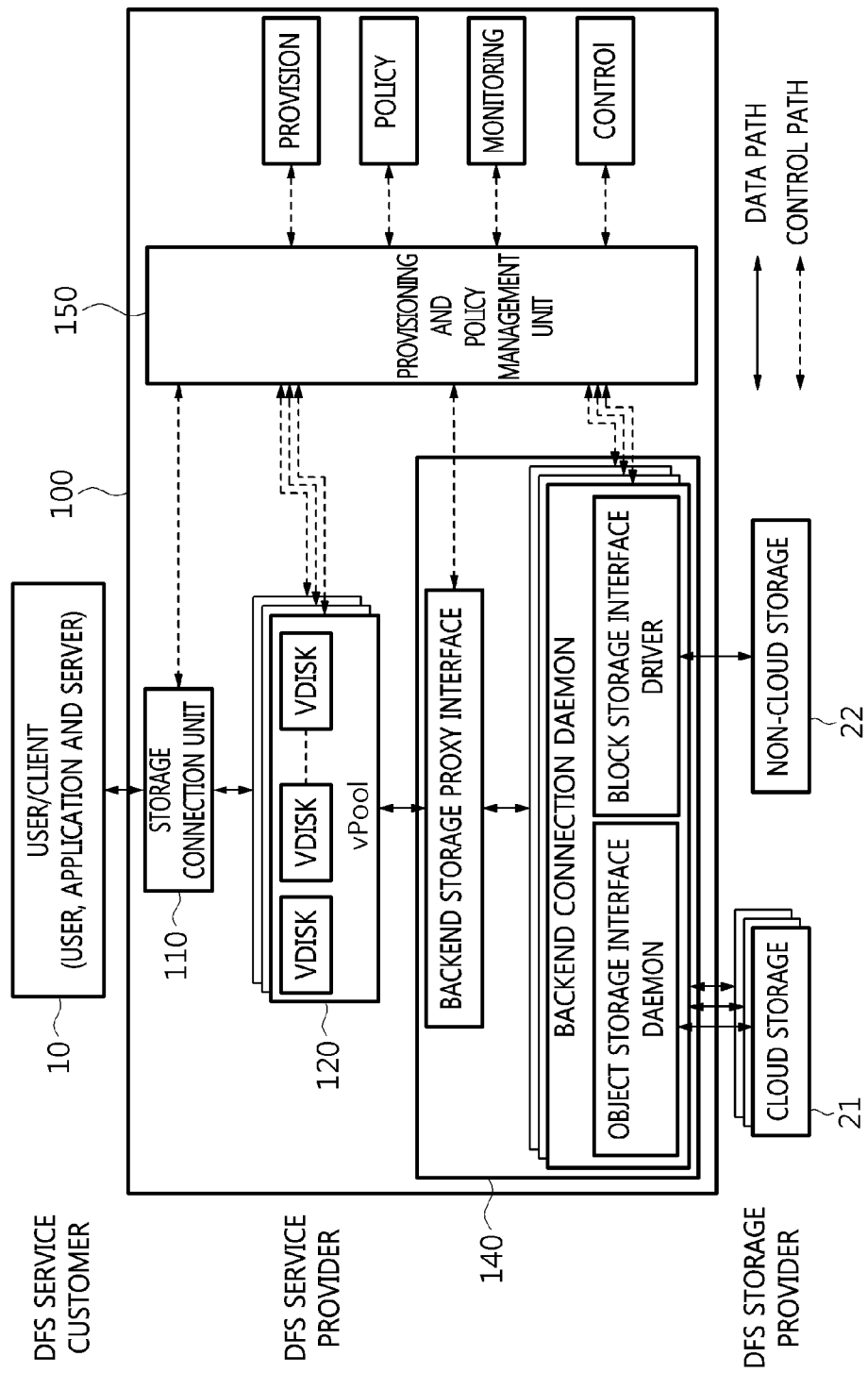
FIG. 11 is a block diagram that shows an apparatus for providing storage for providing a cloud service using a backend connection daemon according to an embodiment of the present invention.

FIG. 11 is a block diagram that shows a storage provision apparatus using a backend connection daemon according to an embodiment of the present invention.

Referring to FIG. 11, the storage provision apparatus using a backend connection daemon according to an embodiment of the present invention includes a single provisioning and policy management unit 150, multiple storage connection units 110, multiple data manipulation units 120, multiple data distribution and storage units 130, and multiple backend storage units 140. Here, the multiple storage connection units 110, the multiple data manipulation units 120, the multiple data distribution and storage units 130, and the multiple backend storage units 140 are provided for respective storage services provided by service providers 31, 32 and 33.

The storage connection unit 110 may provide the storage service of integrated storage 20 by operating in connection with the integrated storage 20.

Here, the integrated storage 20 may include non-cloud storage 22 and at least one cloud storage unit 21.

The data manipulation unit 120 may create a virtual disk pool of the integrated storage 20, thereby providing a single storage view using at least one virtual disk.

Here, the data manipulation unit 120 may provide the integrated storage 20 as virtual data storage regardless of the location at which data is actually stored.

Here, the storage connection unit 110 may provide a user with an interface for using the virtual data storage as a single virtual storage unit.

Here, the storage connection unit 110 may provide information about the configuration of the single virtual storage unit and interface management information to a user in response to a request from the user.

Here, the storage connection unit 110 may provide an access mechanism through which a user may use the single virtual storage unit.

Here, the storage connection unit 110 provides registered information that matches user requirements, and the user requirements may include at least one of the capacity of storage, an access mechanism, and the storage type of the single virtual storage unit.

The data distribution and storage unit 130 may provide a data distribution and encryption function such that the received data to be written may always be accessed with the minimum overhead.

Here, the data distribution and storage unit 130 may distribute the data in order to store the data in the integrated storage 20, including on-premises storage and cloud storage.

The backend storage management unit 140 may interface with the integrated storage 20 using a connection daemon in the form of software.

Here, the backend storage management unit 140 may include an interface for storage (an object storage interface or a block storage interface) and a backend connection daemon configured to interface with various types of storage, and may provide a proxy interface for easy registration of multiple storage devices.

Here, the proxy interface of the backend storage management unit 140 may register a cloud service by detecting the storage area interface of the first daemon, which is connected to the cloud storage 21, or of the second daemon, which is connected to the non-cloud storage 22.

The backend storage proxy may register a service in such a way that the backend connection daemon, which stores an object storage interface daemon or a block storage interface driver therein, automatically detects the storage area interface.

For connection with the integrated storage 20, the backend connection daemon may be run through a virtual machine or a container, excluding a block device, whereby the connection with object storage may be made.

Here, the backend storage management unit 140 may output information about the connected storage as storage in which a storage service may be registered.

Here, the backend storage management unit 140 may manage information for access by a user to a system and provide a secure path for access for registration of a storage service.

Here, the backend storage management unit 140 may create a backend connection daemon whenever a single storage device is connected therewith, and may connect the backend connection daemon with a proxy server. The proxy server (not illustrated) may store and manage data of a user using a driver interface that is connected with a virtual disk pool (vPool) through the data manipulation unit 120.

Here, the backend storage management unit 140 is connected with the integrated storage 20 in order to store data therein, and may provide information about storage tiering pertaining to the data.

Accordingly, the storage provision apparatus 100 may create a single virtual disk (Vdisk) when a registered service provider connects to the storage provision apparatus 100, and the created virtual disk may be managed in the virtual disk pool. Here, using the individual virtual disk pool, a user may be provided with multiple storage services from the storage in which the storage services are registered.

The provisioning and policy management unit 150 may manage provision of storage services based on multi-tenant architecture by receiving registration of the storage services from multiple service providers.

Here, the provisioning and policy management unit 150 enables an administrator to register cloud storage 21 and non-cloud storage 22 for providing a storage service and to configure a new service in the storage provision apparatus 100 using an administration GUI.

Here, when a service provider signs up for the service and uploads and creates a file, the provisioning and policy management unit 150 may create a cloud account, and the uploaded file may be stored in the cloud storage 21 or non-cloud storage 22 at the discretion of the administrator.

Here, the provisioning and policy management unit 150 may also provide the function of displaying, writing, modifying and deleting the content of a cloud service registered in the cloud storage 21 and the non-cloud storage 22, which are integrated into the integrated storage 20, using the administration GUI.

Separately from the non-cloud storage 22, the service of the cloud storage 21 may be provided along with the basic configuration thereof.

Here, the provisioning and policy management unit 150 may configure the functions of logical components as individual servers, virtual systems, or containers having a connection network by taking the form of a module or function having each of the logical component functions.

Here, the provisioning and policy management unit 150 may register the storage service in a storage device that matches service registration information input by a service provider, among the storage devices included in the integrated storage 20.

Here, the provisioning and policy management unit 150 may provide the storage service by configuring virtual storage in the storage in which the storage service is registered.

Here, the provisioning and policy management unit 150 may manage the storage service using a first path, which is a data path along which data is moved, and a second path, which is a control path for controlling data, in order to prevent the I/O performance of the storage service from being degraded.

Figure 12:
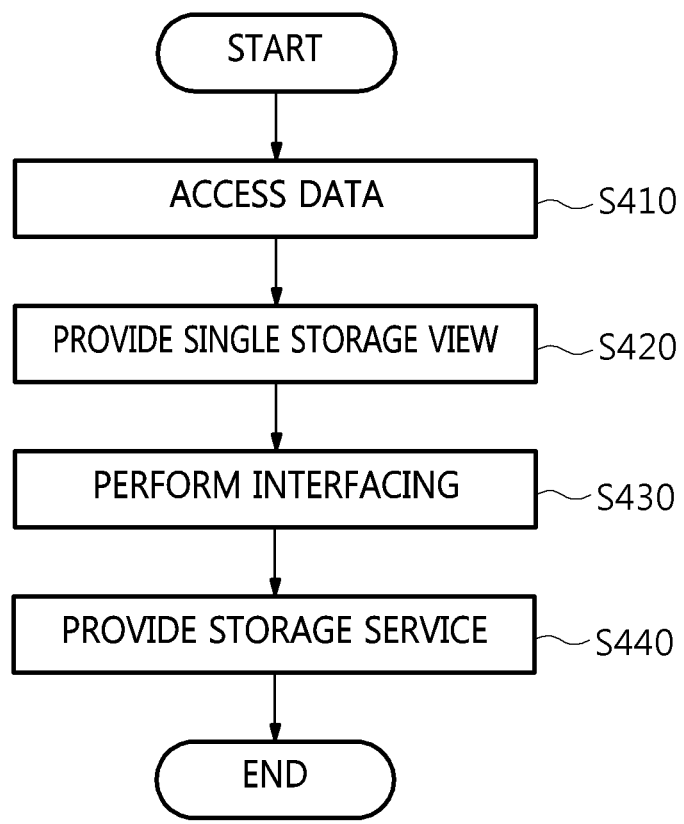
FIG. 12 is a flowchart that shows a method for providing storage according to an embodiment of the present invention.

FIG. 12 is a flowchart that shows a method for providing storage according to an embodiment of the present invention.

Referring to FIG. 12, in the method for providing storage according to an embodiment of the present invention, first, data may be accessed at step S410.

That is, in order to provide a user with the storage service of integrated storage 20, data may be accessed at step S410.

Here, the integrated storage 20 may include non-cloud storage 22 and at least one cloud storage unit 21.

The non-cloud storage 22 may be on-premises storage.

In the method for providing storage according to an embodiment of the present invention, a single storage view may be provided at step S420.

That is, at step S420, a virtual disk pool of the integrated storage 20 is created, whereby a single storage view may be provided using at least one virtual disk.

Here, at step S420, the integrated storage 20 may be provided as virtual data storage regardless of where data is actually stored.

Here, at step S420, an interface for using the virtual data storage as a single virtual storage unit may be provided to the user.

Here, at step S420, information about the configuration of the single virtual storage unit and interface management information may be provided to a user in response to a request from the user.

Here, at step S420, an access mechanism through which a user may use the single virtual storage unit may be provided.

Here, at step S420, registered information matching user requirements is provided, and the user requirements may include at least one of the capacity of storage, an access mechanism, and the storage type of the single virtual storage unit.

Here, at step S420, a data distribution and encryption function may be provided such that the received data to be written is accessed always with the minimum overhead.

Here, at step S420, the data may be distributed so as to be stored in the integrated storage 20, including the on-premises storage and the cloud storage.

Also, in the method for providing storage according to an embodiment of the present invention, interfacing is performed at step S430.

That is, at step S430, interfacing with the integrated storage 20 may be performed using a connection daemon in the form of software.

Here, at step S430, an interface for storage (an object storage interface or a block storage interface), a backend connection daemon configured to interface with various types of storage, and a proxy interface for easy registration of multiple storage devices may be provided.

Here, at step S430, a proxy interface may register a cloud service by detecting the storage area interface of the first daemon, which is connected with the cloud storage 21, and of the second daemon, which is connected with the non-cloud storage 22.

The backend storage proxy may register a service in such a way that the backend connection daemon, which stores an object storage interface daemon or a block storage interface driver therein, automatically detects the storage area interface.

For connection with the integrated storage 20, the backend connection daemon may be run through a virtual machine or a container, excluding a block device, whereby the connection with object storage may be made.

Here, at step S430, information about the connected storage may be output as storage in which a storage service may be registered.

Here, at step S430, information for access by a user to a system may be managed, and a secure path for access for registration of a storage service may be provided.

Here, at step S430, a single backend connection daemon may be created whenever a single storage device is connected, and the backend connection daemon may be connected with a proxy server. The proxy server may store and manage data of a user using a driver interface connected with a virtual disk pool through the data manipulation unit 120.

Here, at step S430, the integrated storage 20 is connected in order to store data therein, and the storage tiering information pertaining to the data may be provided.

Accordingly, the storage provision apparatus 100 may create a single virtual disk in response to access by a registered service provider thereto, and the created virtual disk may be managed in the virtual disk pool. Here, using the individual virtual disk pool, a user may be provided with multiple storage services from the storage in which the storage services are registered.

Also, in the method for providing storage according to an embodiment of the present invention, a storage service may be provided at step S440.

That is, at step S440, the provision of a storage service may be managed based on multi-tenant architecture by receiving registration of storage services from multiple service providers.

Here, at step S440, an administrator may register cloud storage 21 and non-cloud storage 22 for providing a storage service in the storage provision apparatus 100 and configure a new service using an administration GUI.

Here, at step S440, when a service provider signs up for the service and uploads and creates a file, a cloud account may be created, and the uploaded file may be stored in the cloud storage 21 or the non-cloud storage 22 at the discretion of the administrator.

Here, at step S440, the function of displaying, writing, modifying and deleting content of a cloud service registered in the cloud storage 21 and the non-cloud storage 22, which are integrated into the integrated storage 20, may be provided using the administration GUI.

In the configuration of storage, the service of the cloud storage 21 may be provided along with the basic configuration thereof, separately from the non-cloud storage 22.

Here, at step S440, the individual functions of logical components may be configured as servers, virtual systems, or containers having a connection network by implementing modules or functions having the respective logical component functions.

Here, at step S440, the storage service may be registered in a storage device that matches service registration information input by the service provider, among the storage devices included in the integrated storage 20.

Here, at step S440, the storage service may be provided by configuring virtual storage in the storage in which the storage service is registered.

Here, the storage service may be managed using a first path, which is a data path along which data is moved, and a second path, which is a control path for controlling data, in order to prevent I/O performance of the storage service from being degraded.

Figure 13:
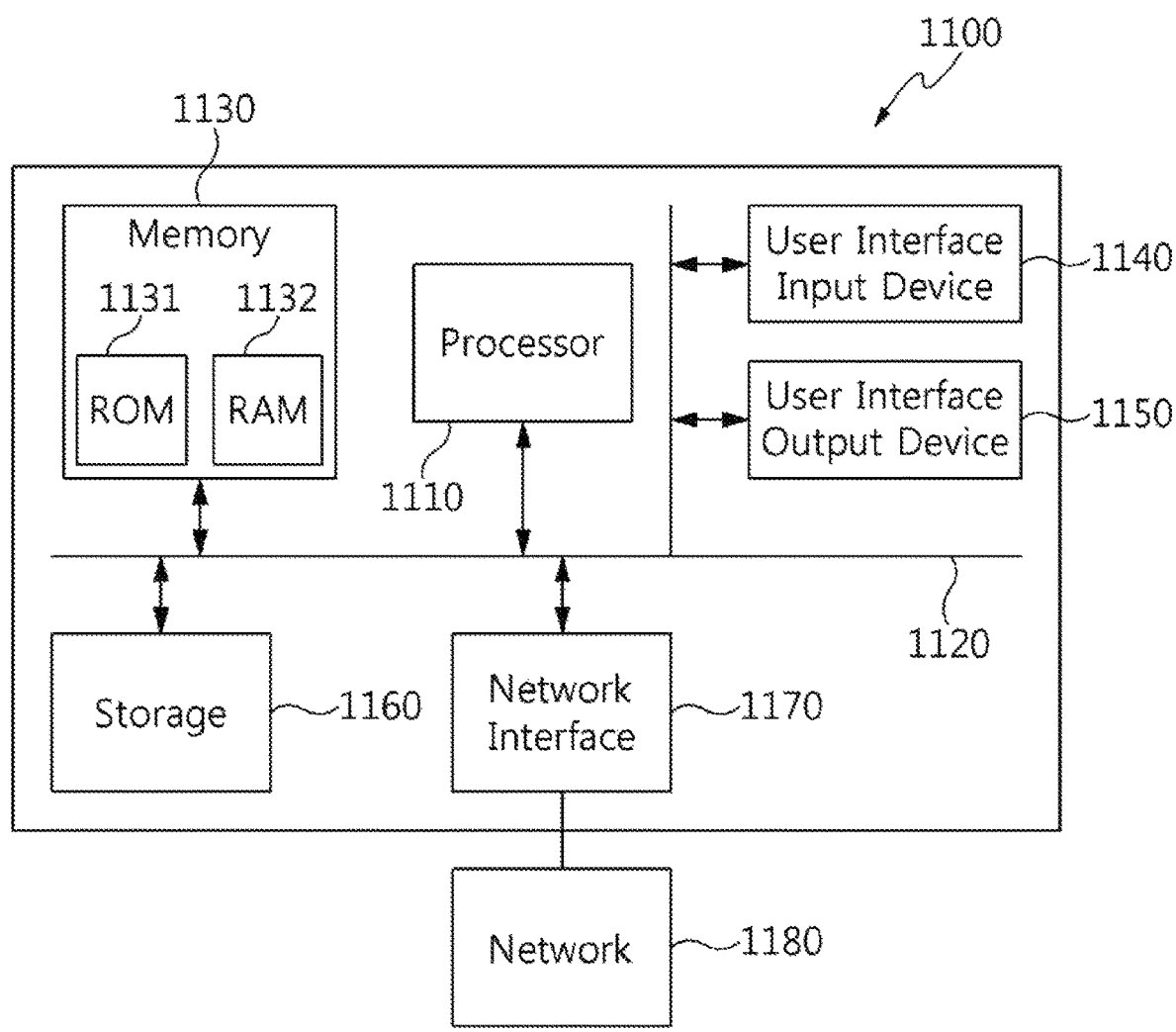
FIG. 13 is a block diagram that shows a computer system according to an embodiment of the present invention.

FIG. 13 is a block diagram that shows a computer system according to an embodiment of the present invention.

Referring to FIG. 13, the user client device 10 and the storage provision apparatus 100 according to an embodiment of the present invention may be implemented in a computer system 1100 including a computer-readable recording medium. As shown in FIG. 13, the computer system 1100 may include at least one processor 1110, memory 1130, a user interface input device 1140, a user interface output device 1150, and storage 1160, which communicate with each other via a bus 1120. Also, the computer system 1100 may further include a network interface 1170 connected with a network 1180. The processor 1110 may be a central processing unit or a semiconductor device for executing processing instructions stored in the memory 1130 or the storage 1160. The memory 1130 and the storage 1160 may be various types of volatile or nonvolatile storage media. For example, the memory may include ROM 1131 or RAM 1132.

The present invention may improve the performance of read and write operations in integrated storage that combines cloud storage and on-premises storage.

Also, the present invention may enable cloud storage and on-premises storage included in integrated storage to provide a data storage service with the same performance.

Also, the present invention may enable data of a user to be moved based on the flexibility of a storage space and cost efficiencies.

Also, the present invention may support various types of cloud storage services, such as Amazon S3, Microsoft Azure, and the like, thereby providing an integrated storage service that meets user requirements.

Also, the present invention may enable data in cloud storage to be accessed at a speed close to the speed at which data in on-premises storage is accessed.

Also, the present invention may provide a service interface through which a user may access cloud-integrated storage using various service protocols.

Also, the present invention may provide various types of storage services, such as a storage service for storing conventional files or data blocks, a storage service for storing objects, which has recently come to be provided by cloud storage providers, and the like.

Also, the present invention may guarantee secure data transfer between on-premises storage and cloud storage, thereby guaranteeing the confidentiality of user data.

Also, the present invention may prevent data loss caused due to system errors.

Also, the present invention may make it easy to construct a system by providing cloud-integrated storage in the form of an appliance in which storage hardware and software are integrated for user convenience.

Also, the present invention may provide a multitenant function for simultaneously performing multiple cloud services.

As described above, the apparatus and method for providing storage for providing a cloud service according to the present invention are not limitedly applied to the configurations and operations of the above-described embodiments, but all or some of the embodiments may be selectively combined and configured, so that the embodiments may be modified in various ways.

What is claimed is:

1. An apparatus for providing storage for providing a cloud service, comprising:
   a data distribution and storage unit for distributing data in order to store the data in an integrated storage, the integrated storage including on-premises storage and cloud storage;
   a backend storage management unit for connecting to the integrated storage and providing information about storage tiering pertaining to distributed data;
   a data manipulation unit for providing the integrated storage as virtual data storage regardless of a location at which the distributed data is actually stored; and
   a storage connection unit for providing a user client with an interface for the virtual data storage as a single virtual storage unit,
   wherein the backend storage management unit provides a function of storing the distributed data using the storage tiering based on performance, time, and frequency of use.

2. The apparatus of claim 1, wherein the data distribution and storage unit minimizes time taken to write and access data by optimizing the data to be written to the integrated storage, and performs compression or encryption of the data.

3. The apparatus of claim 1, wherein the data manipulation unit provides a write buffer function or a read cache function for the distributed data and decrease a response time of a write operation or a read operation for the distributed data using high-speed storage.

4. The apparatus of claim 1, further comprising:
   a provisioning and policy management unit for providing metadata for storing the distributed data,
   wherein the metadata includes first metadata for data operations and second metadata for storage operations.

5. A method for providing storage for providing a cloud service, performed by an apparatus for providing storage for providing a cloud service, the method comprising:
   distributing data in order to store the data in an integrated storage, the integrated storage including on-premises storage and cloud storage; and
   managing distributed data by providing the integrated storage as a virtual data storage regardless of a location at which the distributed data is actually stored and by providing a user client with an interface for the virtual data storage as a single virtual storage unit,
   wherein the managing distributed data includes
      connecting to the integrated storage,
      providing information about storage tiering pertaining to the distributed data, and
      providing a function of storing the distributed data using the storage tiering based on performance, time, and frequency of use.

6. The method of claim 5, wherein the distributing data is configured to:
   minimize time taken to write and access data by optimizing the data to be written to the integrated storage; and
   perform compression or encryption of the data.

7. The method of claim 5, wherein the managing distributed data is configured to provide a write buffer function or a read cache function for the distributed data and to decrease a response time of a write operation or a read operation for the distributed data using high-speed storage.

8. The method of claim 5, further comprising:
   performing provisioning by providing metadata for storing the distributed data,
   wherein the metadata includes first metadata for data operations and second metadata for storage operations.

* * * * *